(No Model.)
R. EXLEY.
STREET WATER SPRINKLER.
No. 417,714. Patented Dec. 24, 1889.
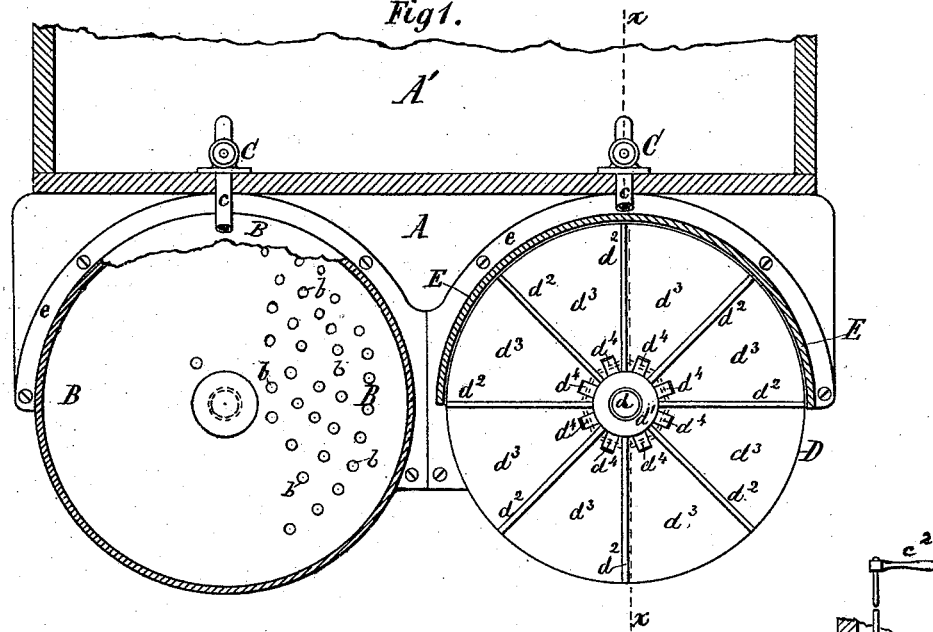
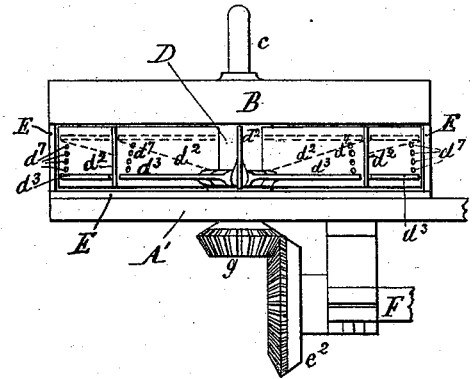
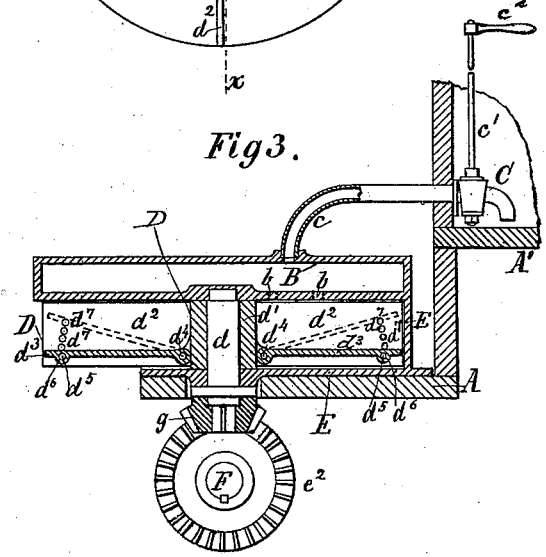
Witnesses:
J. P. Theo. Lang.
E. J. Fenwick
Inventor:
Robert Exley
by his attorneys
Mason Fenwick and Lawrence

UNITED STATES PATENT OFFICE.

ROBERT EXLEY, OF PHILADELPHIA, PENNSYLVANIA.

STREET WATER-SPRINKLER.

SPECIFICATION forming part of Letters Patent No. 417,714, dated December 24, 1889.

Application filed May 23, 1888. Serial No. 274,777. (No model.)

*To all whom it may concern:*

Be it known that I, ROBERT EXLEY, a subject of the Queen of Great Britain, residing at Philadelphia, in the county of Philadelphia and State of Pennsylvania, have invented certain new and useful Improvements in Street Water-Sprinklers; and I do hereby declare the following to be a full, clear, and exact description of the invention, such as will enable others skilled in the art to which it appertains to make and use the same.

My invention relates to centrifugal liquid-sprinklers for sprinkling streets, lawns, and the like; and it consists, first, in certain novel constructions by which the water is introduced vertically to the sprinkling-wheels between their centers and peripheries, and, second, in novel means whereby the spray produced by the sprinkling wheel or wheels can be directed in an upward or oblique direction and also horizontally.

The object of my present invention is to construct a liquid-sprinkler which shall be more effective and certain in its operation.

In the accompanying drawings, Figure 1 is a top view of my invention, showing the rear portion of a water-tank in horizontal section and a sectional portion of a water-chest, also a sprinkling-wheel (from which the water-chest is removed) and water-valves with portions of communicating pipes. Fig. 2 is an end view of one of the sprinkling-wheels in its housing and with its water-chest. Fig. 3 is a vertical central section in the line $x\ x$ of Fig. 1.

The letter A in the drawings represents the rear portion of a water-tank A'; B, a water-chest; C, water-supply valves; D, sprinkling-wheels, and E their housings. The water-tank referred to is mounted on carriage-wheels, and is provided with a suitable mechanism, such as described in my aforesaid patent, whereby the sprinkling-wheels receive their motion from one or both of the rear wheels of the sprinkler. The water in the tank is let out through valves C of ordinary construction, which are fastened to the inner or outer side of the tank, and by means of communicating pipes $c$ lead the water to water chests or reservoirs B, as shown. The valves C are provided with rods $c'$ and operating lever-handles $c^2$, which may by suitable connecting-rods be placed within easy reach and control of the driver, as shown in my said patent. Through a pipe $c$ the water enters a water-chest B, which is in the form of a flat cylinder and below which the wheel-housing E is formed or attached thereto. The wheel-housing is of semicircular form, and it is, by means of a flange $e$, attached to a platform A' of the water-tank A, its rear portion being open. This housing contains a sprinkling-wheel D, which fits the cylindrical and upper sides of the housing. The upright shaft $d$ of the wheel D has its bearings in the bottom of the housing and bottom of the water-chest, as shown, and is below the housing provided with a bevel-wheel $g$, which is moved by a bevel-wheel $e^2$ on a shaft F, the latter being connected with one or both of the rear carriage-wheels of the sprinkler by the mechanism shown in the aforesaid patent.

The sprinkling-wheel D consists of a hub $d'$ and a suitable number of vertical radial arms $d^2$, and between these arms sector bottom plates $d^3$ are provided, the same being hinged at $d^4$ to the hub $d'$, and held in position near their periphery by means of pins $d^5$, passed through holes $d^6$ of said bottom plates into holes $d^7$ in the arms $d^2$. By means of this construction the bottom plates $d^3$ can be elevated from a horizontal to a suitably steep upwardly-inclined position, and, as will be readily seen, when in the latter position, which is shown in dotted lines, the water can be thrown much farther by the bottom plates $d^3$ than when in the horizontal position. Thus the spray can be spread more or less by adopting a more or less inclination of the bottom plates $d^3$. The water supplied to the chests B enters the sprinkling-wheels D through holes $b$ in a vertical direction. These holes $b$ may be arranged at suitable points between the centers or hubs and peripheries of the sprinkling-wheels, but are preferably placed so as to only supply water upon those portions of the wheels which in the revolutions of the wheels are brought nearest to the longitudinal spaces between the respective pairs of wheels, or nearest the central longitudinal line of the sprinkling-carriage, so that the supply of water falling from the chest in small streams shall be perfectly distributed along the arms $d^2$ and bottom plates $d^3$, and thence discharged from between the wheels, and thereby a very uniform spray produced. The spray may be more finely divided and made less copious by plugging up some of the holes $b$.

My invention as described meets the different requirements for sprinkling, and can be adjusted, as circumstances demand, in a very short time, whereas heretofore the sprinkling-machine has been so limited in its operation that it was not practicable to produce both a fine and coarse spray and also a wide and narrow spray by one and the same sprinkling-machine.

What I claim is—

1. In a street-sprinkler or other liquid-distributer, in combination, a tank to contain the liquid, revolving distributing-wheels having radial partitions and bottom plates, intermediate reservoirs, to contain the liquid, adjacent to said wheels, and independent connections between said intermediate reservoirs and each of said distributing-wheels.

2. In a street-sprinkler or other liquid-distributer, in combination, a tank to contain the liquid, revolving distributing-wheels having radial partitions and bottom plates, intermediate reservoirs, to contain the liquid, adjacent to said wheels, and independent connections between said liquid-containing tank and said intermediate reservoirs and said distributing-wheels.

3. In a street-sprinkler or other liquid-distributer, in combination, a tank to contain the liquid, revolving distributing-wheels having radial partitions and bottom plates, a plurality of separated intermediate reservoirs, to contain the liquid, adjacent to said wheels, and having bottoms perforated at different points, whereby intermediate connection is made between each of said intermediate reservoirs and each of said distributing-wheels, and the liquid is evenly distributed practically over the major portion of the bottom plates, between the hubs and peripheries of the wheels, instead of only at a point around each of the hubs, substantially as described.

4. In a street-sprinkler or other liquid-distributer, in combination, a tank to contain the liquid, an intermediate reservoir having a bottom perforated at different points, and a distributing-wheel arranged beneath the reservoir, and having radial partitions and bottom plates, whereby the liquid from said tank is evenly delivered to the distributing-wheel in a vertical direction at different points practically over major portions of the bottom plates, between the hub and periphery of the wheel, instead of only at a point around the hub, substantially as described.

5. In a street-sprinkler or other liquid-distributer, in combination, a tank to contain the liquid and a gear-driven revolving water-distributing wheel provided with radial arms and bottom plates, the latter being attached to the hub of the wheel by horizontal pivots or hinges and upwardly adjustable at their outer ends from a horizontal to any desired oblique or inclined position, whereby water can be thrown off in sheets, streams, or sprays of varied thickness upon streets, lawns, and the like in both horizontal and upwardly-oblique directions, substantially as and for the purpose described.

6. In a street-sprinkler or other liquid-distributer, in combination, a tank to contain the liquid and a revolving distributing-wheel having radial partitions and adjustable bottom plates, the liquid from said tank being delivered to said distributing-wheel in a vertical direction between the periphery and center of said wheel, substantially as described.

7. In a street-sprinkler or other liquid-distributer, in combination, a gear-driven revolving water-distributing wheel provided with radial arms and pivoted bottom plates, which are adjustable in an upward direction from a horizontal to inclined positions at their outer ends, a supply-tank, a perforated water-chest near the hub of said wheel, a water-supply valve and connecting water-pipe between the tank and the water-chest, suitable gear-connections for revolving the wheel, and suitable adjusting devices for holding the plates in their adjusted positions, substantially as described.

8. In a street-sprinkler or other liquid-distributer, in combination, a gear-driven water-distributing wheel having radial arms, bottom plates adjustable upwardly to inclined positions, a vessel to contain the liquid, and a water-chest upon the wheel, between the vessel, to contain the liquid and the wheel, said water-chest having a series of small perforations in its bottom leading into the radial divisions of the wheel, substantially as and for the purpose described.

9. A sprinkler-wheel having radial arms $d^2$, with holes $d^7$, and adjustable bottom plates $d^3$, hinged to the hub $d'$ at $d^4$, and provided with holes $d^6$ and pins $d^5$, substantially as described.

In testimony whereof I hereunto affix my signature in presence of two witnesses.

ROBERT EXLEY.

Witnesses:
FRANCIS LEELIRE,
R. M. HARTLEY.